(12) United States Patent
Kurokawa et al.

(10) Patent No.: US 9,518,175 B2
(45) Date of Patent: Dec. 13, 2016

(54) METHOD FOR PRODUCING FLAME-RETARDANT THERMOPLASTIC ELASTOMER COMPOSITION

(71) Applicant: Sumitomo Chemical Company, Limited, Tokyo (JP)

(72) Inventors: Ryosuke Kurokawa, Chiba (JP); Nobuhiro Natsuyama, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/578,345

(22) Filed: Dec. 20, 2014

(65) Prior Publication Data

US 2015/0183972 A1   Jul. 2, 2015

(30) Foreign Application Priority Data

Dec. 27, 2013   (JP) ................................ 2013-270835

(51) Int. Cl.

| | |
|---|---|
| *C08L 23/00* | (2006.01) |
| *C08L 19/00* | (2006.01) |
| *C08J 3/20* | (2006.01) |
| *C08L 23/16* | (2006.01) |

(52) U.S. Cl.
CPC ............... *C08L 19/00* (2013.01); *C08J 3/203* (2013.01); *C08L 23/16* (2013.01); *C08J 2319/00* (2013.01); *C08J 2323/08* (2013.01); *C08J 2423/12* (2013.01); *C08L 2201/02* (2013.01); *C08L 2312/02* (2013.01)

(58) Field of Classification Search
CPC ........ C08L 19/00; C08J 3/203; C08J 2319/00; C08J 2423/12
USPC ......................................................... 524/528
See application file for complete search history.

(56) References Cited

U.S. PATENT DOCUMENTS

2003/0059637 A1 *   3/2003   Imai ........................ C08L 23/06
                                                              428/515

FOREIGN PATENT DOCUMENTS

| JP | 2005060603 A |   | 3/2005 | |
|---|---|---|---|---|
| JP | 2008063458 | * | 3/2008 | .............. C08L 23/10 |
| JP | 2008063458 A |   | 3/2008 | |
| JP | 2010222402 A |   | 10/2010 | |

* cited by examiner

*Primary Examiner* — Hui Chin
(74) *Attorney, Agent, or Firm* — Panitch Schwarze Belisario & Nadel LLP

(57) ABSTRACT

A flame-retardant thermoplastic elastomer composition is provided to produce a molded article possessing mechanical properties, flame retardancy and softness inherently possessed by a molted article obtained from a thermoplastic elastomer composition containing a mineral oil-based softening agent and a flame retardant and fails to stain a mold after injection molding. A production method includes step (1) obtaining a thermoplastic elastomer composition by dynamically crosslinking a polymer mixture (A) containing an ethylene-α-olefin-based copolymer rubber (A1) and a propylene-based polymer (A2) in the presence of a mineral oil-based softening agent (C) and a crosslinking agent (D), and step (2) kneading the thermoplastic elastomer composition, a halogen-free flame retardant (E), zinc oxide (F), and a thermoplastic resin with a polar group (G). The amounts of the components satisfy condition (p) when starting the dynamic crosslinking in step (1) and satisfy condition (q) when starting the kneading in step (2), respectively.

6 Claims, No Drawings

METHOD FOR PRODUCING FLAME-RETARDANT THERMOPLASTIC ELASTOMER COMPOSITION

BACKGROUND OF THE INVENTION

Technical Field

The present invention relates to methods for producing flame-retardant thermoplastic elastomer compositions.

Background Art

Olefin-based thermoplastic elastomer compositions have been used widely for automotive interior parts, automotive exterior parts, electrical machinery parts, household appliance parts, packaging members, agricultural materials, building members, etc. because they are capable of being processed with a common molding machine for thermoplastic resins and being recycled and they are soft (see Patent Document 1). However, since a thermoplastic elastomer composition is a combustible material, in use of such a thermoplastic elastomer composition for the application in which flame retardancy is required, it was necessary to use the thermoplastic elastomer composition after rendering it flame-retardant.

Well-known methods for making a synthetic resin flame-retardant include methods in which an inorganic phosphorus-based flame retardant typified by red phosphorus and phosphate-based flame retardants, an organophosphorus-based flame retardant typified by triaryl phosphate compounds, a halogen-containing flame retardant, or a metal hydroxide flame retardant is added, and, optionally, a flame retarding aid, such as antimony oxide or a melamine compound, is further added to a synthetic resin. (See Patent Documents 2 to 4.)

PRIOR ART DOCUMENTS

[Patent Document 1] JP-A No. 2003-147133
[Patent Document 2] JP-A No. 2010-222402
[Patent Document 3] JP-A No. 2005-60603
[Patent Document 4] JP-A No. 2008-63458

A mineral oil-based softening agent is sometimes blended in order to improve the softness of a thermoplastic elastomer composition. In order to impart sufficient flame retardancy to a thermoplastic elastomer composition containing a mineral oil-based softening agent, a flame retardant has been required to be blended in a large amount into the composition.

However, blending of a large amount of a flame retardant into a thermoplastic elastomer composition containing a mineral oil-based softening agent has lead to a problem that flowability and molding processability are deteriorated, a problem that softness and mechanical properties of a molded article obtained from the composition are deteriorated, and a problem that a mold is stained when the composition is injection molded.

SUMMARY OF THE INVENTION

An object of the present invention is to provide a flame-retardant thermoplastic elastomer composition from which there can be produced a molded article possessing mechanical properties, flame retardancy and softness inherently possessed by a molted article obtained from a thermoplastic elastomer composition containing a mineral oil-based softening agent and a flame retardant and which fails to stain a mold after injection molding.

One embodiment of the present invention is a method for producing a flame-retardant thermoplastic elastomer composition, wherein the method comprises:

step (1) of obtaining a thermoplastic elastomer composition by dynamically crosslinking a polymer mixture (A) comprising an ethylene-α-olefin-based copolymer rubber (A1) and a propylene-based polymer (A2) in the presence of a mineral oil-based softening agent (C) and a crosslinking agent (D), and step (2) of kneading the thermoplastic elastomer composition, a halogen-free flame retardant (E), zinc oxide (F), and a thermoplastic resin with a polar group (G), wherein the amounts of the respective components at the time of starting the dynamic crosslinking in step (1) satisfy the following condition (p), and the amounts of the respective components at the time of starting the kneading in step (2) satisfy the following condition (q), condition (p): when the combined amount of the ethylene-α-olefin-based copolymer rubber (A1), the propylene-based polymer (A2) and the mineral oil-based softening agent (C) is taken as 100% by weight, the amount of the ethylene-α-olefin-based copolymer rubber (A1) is 10% by weight to 75% by weight, the amount of the propylene-based polymer (A2) is 10% by weight to 50% by weight, and the amount of the mineral oil-based softening agent (C) is 1% by weight to 60% by weight, and the amount of the crosslinking agent (D) is 0.001 parts by weight to 5 parts by weight relative to 100 parts by weight of the combined amount of the polymer mixture (A) and the mineral oil-based softening agent (C)

condition (q): the combined amount of the halogen-free flame retardant (E) and the zinc oxide (F) is 30 parts by weight to 70 parts by weight and the amount of the thermoplastic resin with a polar group (G) is 0.5 parts by weight to 10 parts by weight each relative to 100 parts by weight of the thermoplastic elastomer composition.

Another embodiment of the present invention is a method for producing a flame-retardant thermoplastic elastomer composition, wherein the method comprises:

step (1) of obtaining a thermoplastic elastomer composition by dynamically crosslinking a polymer mixture (A) comprising an ethylene-α-olefin-based copolymer rubber (A1) and a propylene-based polymer (A2) in the presence of a mineral oil-based softening agent (C) and a crosslinking agent (D), and step (2) of kneading the thermoplastic elastomer composition, a halogen-free flame retardant (E), zinc oxide (F), a thermoplastic resin with a polar group (G), and a polyhydroxy compound (H), wherein the amounts of the respective components at the time of starting the dynamic crosslinking in step (1) satisfy the following condition (p), and the amounts of the respective components at the time of starting the kneading in step (2) satisfy the following condition (q), (p): when the combined amount of the ethylene-α-olefin-based copolymer rubber (A1), the propylene-based polymer (A2) and the mineral oil-based softening agent (C) is taken as 100% by weight, the amount of the ethylene-α-olefin-based copolymer rubber (A1) is 10% by weight to 75% by weight, the amount of the propylene-based polymer (A2) is 10% by weight to 50% by weight, and the amount of the mineral oil-based softening agent (C) is 1% by weight to 60% by weight, and the amount of the crosslinking agent (D) is 0.001 parts by weight to 5 parts by weight relative to 100 parts by weight of the combined amount of the polymer mixture (A) and the mineral oil-based softening agent (C)

(q): the combined amount of the halogen-free flame retardant (E) and the zinc oxide (F) is 30 parts by weight to 70 parts by weight, the amount of the thermoplastic resin with a polar group (G) is 0.5 parts by weight to 10 parts by weight, and the amount of the polyhydroxy compound (H) is 0.5 parts by weight to 10 parts by weight each relative to 100 parts by weight of the thermoplastic elastomer composition.

The present invention provides a flame-retardant thermoplastic elastomer composition which is high in softness, flowability, molding processability and mechanical properties and excellent in flame retardancy and which fails to stain a mold even if the composition is injection molded.

DETAILED DESCRIPTION OF THE PREFERRED EMBODIMENTS

[Flame-Retardant Thermoplastic Elastomer Composition]
(Ethylene-α-Olefin-Based Copolymer Rubber (A1))

The ethylene-α-olefin-based copolymer rubber (A1) is sometimes called component (A1). Component (A1) is any copolymer having structural units derived from ethylene and structural units derived from an α-olefin having 3 to 10 carbon atoms. Examples of the α-olefin having 3 to 10 carbon atoms include propylene, 1-butene, 2-methylpropylene, 1-pentene, 3-methyl-1-butene, 1-hexene, 4-methyl-1-pentene, and 1-octene. Component (A1) may have structural units derived from two or more types of α-olefins. Preferred as the α-olefin having 3 to 10 carbon atoms are α-olefins having 3 to 6 carbon atoms, and more preferred are propylene and 1-butene. Component (A1) has no polar groups.

Component (A1) also may have structural units derived from a monomer other than ethylene and the α-olefins having 3 to 10 carbon atoms. Examples of such a monomer include conjugated dienes having 4 to 8 carbon atoms such as 1,3-butadiene, 2-methyl-1,3-butadiene (isoprene), 1,3-pentadiene, and 2,3-dimethyl-1,3-butadiene; and non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene. Component (A1) may also have two or more types of structural units derived from monomers other than ethylene and the α-olefins having 3 to 10 carbon atoms. Preferable monomers include 5-ethylidene-2-norbornene and dicyclopentadiene.

The content of the structural units derived from ethylene in component (A1) is 35% by weight to 90% by weight, preferably 40% by weight to 80% by weight, and the content of the structural units derived from the α-olefin having 3 to 10 carbon atoms in component (A1) is 10% by weight to 65% by weight, preferably 20% by weight to 60% by weight. The content of the structural units derived from the monomer other than the structural units derived from ethylene and the structural units derived from the α-olefin in component (A1) is 0% by weight to 30% by weight, preferably 0% by weight to 20% by weight. The total amount of all the structural units derived from monomers in component (A1) is taken as 100% by weight.

Examples of component (A1) include an ethylene-propylene copolymer rubber, an ethylene-1-butene copolymer rubber, an ethylene-1-hexene copolymer rubber, an ethylene-1-octene copolymer rubber, an ethylene-propylene-1-butene copolymer rubber, an ethylene-propylene-1-hexene copolymer rubber, an ethylene-propylene-1-octene copolymer rubber, an ethylene-propylene-5-ethylidene-2-norbornene copolymer rubber, an ethylene-propylene-dicyclopentadiene copolymer rubber, an ethylene-propylene-1,4-hexadiene copolymer rubber, and an ethylene-propylene-5-vinyl-2-norbornene copolymer rubber. Component (A1) may contain two or more ethylene-α-olefin-based copolymer rubbers. Preferable component (A1) is an ethylene-propylene copolymer rubber or an ethylene-propylene-5-ethylidene-2-norbornene copolymer rubber in each of which the content of the structural units derived from ethylene is 40% by weight to 80% by weight, the content of the structural units derived from propylene is 15% by weight to 60% by weight, and the content of the structural units derived from 5-ethylidene-2-norbornene is 0% by weight to 20% by weight.

The Mooney viscosity ($ML_{1+4}$ 100° C.) of component (A1) is preferably 5 to 300, more preferably 10 to 200. If the Mooney viscosity is excessively low, a molded article made of a flame-retardant thermoplastic elastomer composition obtained using component (A1) is sometimes low in mechanical strength. If the Mooney viscosity is excessively high, the appearance of a molded article formed from the flame-retardant thermoplastic elastomer composition obtained using the method according to the present invention is sometimes poor. The Mooney viscosity ($ML_{1+4}$ 100° C.) is measured in accordance with JIS K6300. ($ML_{1+4}$ 100° C.) has the following meanings:
M: Mooney viscosity,
L: a large rotor was used,
100° C.: measurement temperature,
1+4: a value measured when a rotor was rotated at 2 rpm for 4 minutes after the sample was heated for 1 minute.

The intrinsic viscosity of component (A1) measured in 135° C. tetralin is preferably 0.5 dl/g to 8 dl/g, more preferably 1 dl/g to 6 dl/g. If the intrinsic viscosity is excessively low, a molded article made of a flame-retardant thermoplastic elastomer composition obtained using component (A1) is sometimes low in mechanical strength. If the intrinsic viscosity is excessively high, the appearance of a molded article formed from the flame-retardant thermoplastic elastomer composition obtained using the method according to the present invention is sometimes poor.

An example of a method for producing component (A1) is a method comprising copolymerizing ethylene, an α-olefin, and optionally other monomers by a conventional polymerization technique, such as slurry polymerization, solution polymerization, bulk polymerization, and vapor phase polymerization, using a conventional Ziegler-Natta catalyst or a conventional metallocene- or non-metallocene-based complex catalyst.

(Propylene-Based Polymer (A2))

The propylene-based polymer (A2) is sometimes called component (A2). Component (A2) is a propylene homopolymer, a propylene-based random copolymer, or a propylene-based block copolymer. Component (A2) may contain two or more sorts of these copolymers. When component (A2) contains structural units derived from ethylene, the content of the structural units derived from ethylene is less than 35% by weight. The total amount of all the structural units derived from monomers in component (A2) is taken as 100% by weight. Component (A2) has no polar groups.

The aforementioned propylene-based random copolymer is preferably any one of the following (1) to (3),
(1) a propylene-ethylene random copolymer in which the content of the structural units derived from propylene is 90% by weight to 99.5% by weight and the content of the structural units derived from ethylene is 0.5% by weight to 10% by weight (the sum total of the structural units derived from propylene and the structural units derived from ethylene is taken as 100% by weight);

(2) a propylene-ethylene-α-olefin random copolymer in which the content of the structural units derived from propylene is 90% by weight to 99% by weight, the content of the structural units derived from ethylene is 0.5% by weight to 9.5% by weight, and the content of the structural units derived from the α-olefin having 4 to 10 carbon atoms is 0.5% by weight to 9.5% by weight (the sum total of the structural units derived from propylene, the structural units derived from ethylene and the structural units derived from the α-olefin is taken as 100% by weight);

(3) a propylene-α-olefin random copolymer in which the content of the structural units derived from propylene is 90% by weight to 99.5% by weight and the content of the structural units derived from an α-olefin having 4 to 10 carbon atoms is 0.5% by weight to 10% by weight (the sum total of the structural units derived from propylene and the structural units derived from the α-olefin is taken as 100% by weight).

The above-mentioned propylene-based block copolymer is a mixture composed of a first polymer and a second polymer produced by a production method comprising:

step (a) of producing the first polymer, which is a random copolymer made up of propylene and one or more olefins selected from the group consisting of ethylene and α-olefins having 4 to 10 carbon atoms or a propylene homopolymer, and step (b) of producing the second polymer, which is a random copolymer made up of propylene and one or more olefins selected from the group consisting of ethylene and α-olefins having 4 to 10 carbon atoms in the presence of the first polymer, wherein the content of the structural units derived from the monomers other than propylene contained in the second polymer (that is, the sum total of the content of the structural units derived from ethylene and the content of the structural units derived from the α-olefin having 4 to 10 carbon atoms) is greater than the content of the structural units derived from the monomers other than propylene in the first polymer.

The block copolymer is preferably a polymer in which the content of the structural units derived from the monomers other than propylene contained in the first polymer is 0% by weight to 10% by weight (the sum total of all the structural units derived from monomers contained in the first polymer is taken as 100% by weight), more preferably a copolymer in which the content of the structural units derived from the monomers other than propylene contained in the second polymer is 20% by weight to 80% by weight (the sum total of all the structural units derived from monomers contained in the second polymer is taken as 100% by weight). The block copolymer is preferably a copolymer in which the content of the second polymer is 10% by weight to 35% by weight (the amount of the block copolymer is taken as 100% by weight).

Examples of the above-mentioned α-olefin having 4 to 10 carbon atoms include linear α-olefins such as 1-butene, 1-pentene, 1-hexene, 1-octene, and 1-decene, and branched α-olefins such as 3-methyl-1-butene and 3-methyl-1-pentene. Component (A2) may have structural units derived from two or more types of α-olefins having 4 to 10 carbon atoms.

From the processability point of view, the melt flow rate (MFR) of component (A2) measured at 230° C. under a load of 21.18 N in accordance with JIS K7210 is preferably 0.1 g/10 min to 150 g/10 min, more preferably 0.1 g/10 min to 100 g/10 min.

Examples of component (A2) include a propylene homopolymer, an ethylene-propylene random copolymer, an ethylene-propylene-butene random copolymer, an ethylene-propylene block copolymer, and an ethylene-propylene-butene block copolymer. Especially, propylene homopolymers, ethylene-propylene random copolymers, and ethylene-propylene block copolymers are preferred.

An example of a method for producing component (A2) is a method comprising homopolymerizing propylene or copolymerizing propylene and other monomers by a conventional polymerization technique, such as slurry polymerization, solution polymerization, bulk polymerization, and vapor phase polymerization, using a conventional Ziegler-Natta catalyst or a conventional metallocene- or non-metallocene-based complex catalyst.

(Polymer Mixture (A))

The polymer mixture (A) is sometimes called component (A). Component (A) comprises an ethylene-α-olefin-based copolymer rubber (A1) and a propylene-based polymer (A2). Component (A) may also contain an olefinic polymer other than component (A1) and component (A2). The olefinic polymer other than component (A1)) and component (A2) is preferably an ethylene-based polymer.

The ethylene-based polymer is a polymer containing structural units derived from ethylene in an amount of 90% by weight, exclusive, to 100% by weight, inclusive. The overall amount of all the structural units derived from monomers in the ethylene-based polymer is taken as 100% by weight.

Examples of the ethylene-based polymer include ethylene homopolymers and copolymers of one or more α-olefins having 3 to 10 carbon atoms (e.g., propylene, 1-butene, 1-pentene, 4-methyl-1-pentene, and 1-hexene) with ethylene. Preferred as the ethylene-based polymer are high density polyethylene, low density polyethylene, ethylene-propylene copolymers, ethylene-1-butene copolymers, ethylene-1-pentene copolymers, ethylene-4-methyl-1-pentene copolymers, and ethylene-1-hexene copolymers, and more preferred is high density polyethylene.

The melt flow rate (measured under a load of 21.18 N at a temperature of 190° C. in accordance with JIS K6760) of the ethylene-based polymer is preferably 0.01 g/10 min to 300 g/10 min, more preferably 0.1 g/10 min to 200 g/10 min.

The high density polyethylene to be used for the present invention is a polymer containing structural units derived from ethylene in an amount of 90% by weight, exclusive, and 100% by weight, inclusive, and having a density of 940 kg/m$^3$ or more as measured in accordance with JIS K7112.

The melt flow rate (measured under a load of 21.18 N at a temperature of 190° C. in accordance with JIS K6760) of the high density polyethylene is preferably 0.01 g/10 min to 300 g/10 min, more preferably 0.1 g/10 min to 200 g/10 min, even more preferably 0.5 g/10 min to 50 g/10 min, and particularly preferably 1 g/10 min to 10 g/10 min.

(Mineral Oil-Based Softening Agent (C))

The mineral oil-based softening agent (C) is sometimes called component (C). Examples of component (C) include high-boiling fractions of petroleum (with an average molecular weight of 300 to 1500 and a pour point of 0° C. or lower), such as aromatic mineral oil, nathphenic mineral oil, and paraffinic mineral oil. Among these, paraffinic mineral oil is preferred.

Component (C) may be an extending oil of component (A1). When component (A1) is an oil-extended rubber, the amount of component (C) to be mixed with component (A1) is preferably 10 parts by weight to 200 parts by weight, more preferably 20 parts by weight to 150 parts by weight, and even more preferably 40 parts by weight to 120 parts by weight, where the amount of component (A1) is taken as 100 parts by weight. If there is too much component (C), the strength of a molded article formed from the flame-retardant thermoplastic elastomer composition obtained by the method according to the present invention may lower, whereas if there is too little component (C), processability may deteriorate.

A conventional method is used as a method for blending component (C) with component (A1). Examples of such a method include a method comprising mechanically kneading component (A1) and component (C) together using a kneading apparatus such as a roll and a Banbury mixer, and a method comprising preparing a mixed liquid by adding a prescribed amount of component (C) to a solution of component (A1) dissolved in a solvent, and then removing the solvent from the mixed liquid by such a method as steam stripping.

(Crosslinking Agent (D))

The crosslinking agent (D) is sometimes called component (D). Examples of the component (D) include organic peroxides, sulfur compounds, and alkylphenol resins. Especially, organic peroxides are preferred.

Examples of such organic peroxides include conventional ketone peroxides, diacyl peroxides, hydroperoxides, dialkyl peroxides, peroxyketals, alkyl peresters, percarbonates, peroxydicarbonates, and peroxyesters.

Examples of specific organic peroxides include dicumyl peroxide, 2,5-dimethyl-2,5-di-(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di-tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide. Two or more organic peroxides may be used.

Component (D) may be combined with a crosslinking aid. Preferable crosslinking aids are compounds having two or more double bonds. Examples of the crosslinking aid include peroxide crosslinking aids, such as N,N-m-phenylenebismaleimide, toluylene bismaleimide, p-quinonedioxime, nitrosobenzene, diphenylguanidine, and trimethylolpropane; polyfunctional vinyl monomers, such as divinylbenzene, triallyl cyanurate, triallyl isocyanurate, ethylene glycol dimethacrylate, polyethylene glycol dimethacrylate, trimethylolpropane trimethacrylate, and allyl methacrylate. Especially, trimethylolpropane trimethacrylate is preferred.

(Halogen-Free Flame Retardant (E))

The halogen-free flame retardant (E) is sometimes called component (E). As component (E), there can be used a halogen-free flame retardant which is commonly used as a flame retardant for polyolefin. Specific examples thereof include metal salts such as aluminum hydroxide, magnesium hydroxide, and calcium aluminate, organophosphate compounds such as triphenyl phosphate, tricresyl phosphate, bisphenol-A-bisdiphenyl phosphate, and resorcinol-bisdiphenyl phosphate, phosphate compounds such as ammonium polyphosphate, piperazine polyphosphate, piperazine orthophosphate, melamine pyrophosphate, piperazine pyrophosphate, melamine polyphosphate, melamine orthophosphate, calcium phosphate, and magnesium phosphate. Two or more flame retardants may be used. Out of these, phosphate compounds are preferred.

There can likewise be used compounds named by replacing the term "melamine" or "piperazine" in the above examples of the phosphate compound by N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

(Zinc Oxide (F))

The zinc oxide (F) is sometimes called component (F). Component (F) may be zinc oxide having been surface treated. As the component (F), there can be used, for example, commercially available products such as zinc oxide Type II produced by Seido Chemical Industry Co., Ltd., zinc oxide Type I produced by Mitsui Mining & Smelting Co., Ltd., partially coated type zinc oxide produced by Mitsui Mining & Smelting Co., Ltd., NANO FINE 50 (ultrafine particle zinc oxide with an average particle diameter of 0.02 μm, produced by Sakai Chemical Industry Co., Ltd.), and NANO FINE K (ultrafine particle zinc oxide coated with zinc silicate having an average particle diameter of 0.02 μm, produced by Sakai Chemical Industry Co., Ltd.).

(Mixture of Halogen-Free Flame Retardant and Zinc Oxide)

A mixture in which a halogen-free flame retardant and zinc oxide have beforehand been mixed may be used as component (E) and component (F). Preferred as the mixture of a halogen-free flame retardant and zinc oxide is a mixture of a phosphate and zinc oxide, and specific examples thereof include "ADK STAB FP-2200" produced by ADEKA CORPORATION and "ADK STAB FP-2200S" produced by ADEKA CORPORATION.

As to the proportions of component (E) and component (F), component (F) is contained preferably in an amount of 0.1 parts by weight to 20 parts by weight, more preferably 1 part by weight to 15 parts by weight, and even more preferably 5 parts by weight to 10 parts by weight, relative to 100 parts by weight of component (E).

(Thermoplastic Resin with a Polar Group (G))

The thermoplastic resin with a polar group (G) may also be called component (G). Examples of component (G) include an ethylene-based polymer with a polar group, a propylene-based polymer with a polar group, and a phenolic resin. The polar group as referred to herein means a functional group containing one or more atoms selected from the group consisting of oxygen, sulfur, nitrogen, and halogen. Specific examples thereof include a carboxyl group, a carboxylic anhydride group, a carboxylic acid ester group, a hydroxyl group, an epoxy group, an amide group, a cyano group, an amino group, an imido group, an isocyanate group, an acetyl group, a thiol group, an alkoxy group, a thioether group, a sulfone group, a phosphonic group, a nitro group, a urethane group, a methoxycarbonyl group, an acetoxy group, and a halogen atom.

The ethylene-based polymer with a polar group (G1) may also be called component (G1). Component (G1) is an ethylene-unsaturated ester copolymer comprising structural units derived from ethylene and structural units derived from an unsaturated ester, wherein the content of the structural units derived from the unsaturated ester is 0.1% by weight to 35% by weight. The sum total of the content of the structural units derived from ethylene and the content of the structural units derived from the unsaturated ester is taken as 100% by weight. Component (G1) may contain structural units derived from two or more types of unsaturated esters. In order to suppress bleeding out of the components contained in the flame-retardant thermoplastic elastomer composition, the content of the structural units derived from the unsaturated ester is preferably 5% by weight to 35% by weight, more preferably 10% by weight to 30% by weight.

Examples of the unsaturated ester include a vinyl carboxylate and an alkyl unsaturated carboxylate. Examples of the vinyl carboxylate include vinyl acetate and vinyl propionate. Examples of the alkyl unsaturated carboxylate include methyl acrylate, ethyl acrylate, butyl acrylate, methyl methacrylate, ethyl methacrylate and glycidyl methacrylate.

Examples of component (G1) include an ethylene-vinyl acetate copolymer, an ethylene-vinyl propionate copolymer, an ethylene-methyl acrylate copolymer, an ethylene-ethyl acrylate copolymer, an ethylene-butyl acrylate copolymer, an ethylene-methyl methacrylate copolymer, an ethylene-ethyl methacrylate copolymer, an ethylene-glycidyl methacrylate copolymer, and an ethylene-vinyl acetate-methyl methacrylate copolymer.

The melt flow rate (MFR) of component (G1) is preferably 1 g/10 min to 50 g/10 min, more preferably 2 g/10 min to 40 g/10 min, in order to improve processability. The MFR is measured at a temperature of 190° C. and a load of 21.18 N by the method defined in JIS K7210-1995.

From the viewpoint of improving processability, the molecular weight distribution (Mw/Mn) of component (G1) is preferably 2 to 8, more preferably 2.5 to 5, and even more preferably 3 to 4.5. Mw denotes the weight average molecular weight of component (G1) and Mn denotes the number average molecular weight of component (G1).

The polyethylene-equivalent weight average molecular weight of component (G1) is preferably 40000 to 80000, more preferably 50000 to 70000. The polyethylene-equivalent weight average molecular weight is determined by the following method. First, the polystyrene-equivalent weight average molecular weight of component (G1) is determined by gel permeation chromatographic measurement. The polyethylene-equivalent weight average molecular weight is a product of the polystyrene-equivalent weight average molecular weight and the ratio of the Q factor of polyethylene to the Q factor of polystyrene (17.7/41.3).

The content of the structural units derived from the unsaturated ester compound in component (G1) is determined by measuring the infrared absorption spectrum of a press sheet of component (G1). Specifically, the absorbance of a characteristic absorption of the infrared absorption spectrum is corrected with the thickness of the press sheet and then the content is determined by a calibration curve method.

For example, when the unsaturated ester is vinyl acetate, the content of the structural units derived from vinyl acetate in an ethylene-vinyl acetate copolymer can be measured in accordance with JIS K7192. A 1740 cm$^{-1}$ peak assigned to the carbonyl bond of vinyl acetate is used as the characteristic absorption of the infrared absorption spectrum and the absorbance of the peak is corrected with the press sheet thickness.

For example, when the unsaturated ester is methyl methacrylate, the content of the structural units derived from methyl methacrylate of an ethylene-methyl methacrylate copolymer can be determined according to the following formula using a peak at 3448 cm$^{-1}$ assigned to the carbonyl bond of methyl methacrylate as the characteristic absorption of the infrared absorption spectrum.

For example, when the unsaturated ester is glycidyl methacrylate, the content of the structural units derived from glycidyl methacrylate in an ethylene-glycidyl methacrylate copolymer can be determined according to the following formula using a peak at 910 cm$^{-1}$ assigned to the ether bond of glycidyl methacrylate as the characteristic absorption of the infrared absorption spectrum.

The content of the structural units derived from an unsaturated ester (% by weight)=$4.1 \times \log(I_0/I)/t - 5.3$ where I represents the transmitted light intensity at a characteristic absorption, $I_0$ represents the incident light intensity at the characteristic absorption, and t represents the thickness (cm) of a sample sheet for measurement.

Examples of component (G1) to be used for the present invention include "ACRYFT WK307" produced by Sumitomo Chemical Co., Ltd., "ACRYFT WK402" produced by Sumitomo Chemical Co., Ltd., and the commercial name "ACRYFT WH401" produced by Sumitomo Chemical Co., Ltd.

The phenolic resin (G2) may also be called component (G2). Component (G2) is a novolac type phenol resin having an alkyl substituent and is preferably a condensate of a phenol at least one hydrogen atoms of which has been substituted with an alkyl group having 2 to 20 carbon atoms and an aldehyde having 1 to 5 carbon atoms.

Examples of the alkyl group include linear alkyl groups, branched alkyl groups, and alicyclic alkyl groups and specifically include linear alkyl groups such as an ethyl group, a n-propyl group, a n-butyl group, a n-pentyl group, a n-octyl group, a n-nonyl group, a n-decyl group, a n-undecanyl group, a n-octadecyl group, and n-dodecyl group; branched alkyl groups such as an isopropyl group, a tert-butyl group, and an ethylhexyl group; and alicyclic alkyl groups such as a cyclopentyl group and a cyclohexyl group. As the alkyl group, an alkyl group having 4 to 18 carbon atoms is preferred.

Examples of the aldehyde having 1 to 5 carbon atoms include aldehydes such as formaldehyde, acetaldehyde, n-butylaldehyde, glyoxal, glutaraldehyde, glyoxylic acid, and paraformaldehyde; above all, formaldehyde, acetaldehyde, and paraformaldehyde are preferred, and formaldehyde is particularly preferred.

Usually, the novolac type phenol resin having an alkyl substituent to be used for the present invention particularly preferably comprises, as a main component, a phenol resin having about 2 to about 5 structural units derived from phenol having an alkyl substituent in its resin chain.

As a novolac type phenol resin having an alkyl substituent, "Hitanol 1501" (registered trademark, produced by Hitachi Chemical Co., Ltd.), "Tackirol 101" (registered trademark, produced by Taoka Chemical Co., Ltd.), "TAMANOL 7508" (registered trademark, produced by Arakawa Chemical Industries, Ltd.), etc. are commercially available, and these commercially available products may be used.

The propylene-based polymer with a polar group (G3) may also be called component (G3). The propylene-based polymer with a polar group may have a functional group in the main chain of the propylene-based polymer or alternatively may have a functional group as a side chain of the propylene-based polymer.

Examples of component (G3) include a propylene homopolymer with a polar group, a propylene-based random copolymer with a polar group, and a propylene-based block copolymer with a polar group. Component (G3) may contain two or more kinds of propylene-based polymers with a polar group.

Examples of the propylene-based random copolymer with a polar group or the propylene-based block copolymer with a polar group include random copolymers or block copolymers of a propylene-ethylene copolymer with a polar group, a propylene-1-butene copolymer with a polar group, a propylene-ethylene-1-butene copolymer with a polar group, a propylene-1-hexene copolymer with a polar group, a propylene-1-octene copolymer with a polar group, and a propylene-ethylene-1-hexene copolymer with a polar group. Preferably, the propylene-based polymer with a polar group is a propylene homopolymer with a polar group, a propylene-ethylene copolymer with a polar group, a propylene-1-butene copolymer with a polar group, and a propylene-ethylene-1-butene copolymer with a polar group.

Examples of the polar group contained in component (G3) include a carboxyl group, a carboxylic anhydride group, a carboxylic acid ester group, a hydroxyl group, an epoxy group, an amide group, a nitrile group, a cyano group, an amino group, an imido group, an isocyanate group, an acetyl group, a thiol group, an alkoxy group, a thioether group, a sulfone group, a phosphone group, a nitro group, a urethane group, and a halogen atom. Component (G3) may contain two or more kinds of polar groups.

Component (G3) preferably contains a carboxyl group, a carboxylic anhydride group, a carboxylic acid ester group, an epoxy group, an amide group, or an ammonium group. Component (G3) is a propylene-based polymer having one or more kinds of structural units selected from the group consisting of structural units derived from an unsaturated carboxylic acid, structural units derived from an unsaturated carboxylic acid derivative, structural units derived from an α,β-unsaturated glycidyl ester, and structural units derived from an α,β-unsaturated glycidyl ether.

Examples of the unsaturated carboxylic acid include maleic acid, fumaric acid, itaconic acid, acrylic acid, and methacrylic acid. Examples of the unsaturated carboxylic acid derivative include anhydrides, ester compounds, amide compounds, imide compounds, and metal salts of unsaturated carboxylic acids. Specific examples of the unsaturated carboxylic acid derivatives include maleic anhydride, itaconic anhydride, methyl acrylate, ethyl acrylate, butyl acrylate, methyl methacrylate, ethyl methacrylate, butylmethacrylate, 2-hydroxyethylmethacrylate, monoethyl maleate, diethyl maleate, monomethyl fumarate, dimethyl fumarate, acrylamide, methacrylamide, maleic acid monoamide, maleic acid diamide, fumaric acid monoamide, maleimide, N-butylmaleimide, and sodium methacrylate. The unsaturated carboxylic acid is preferably maleic acid or acrylic acid, and the unsaturated carboxylic acid derivative is preferably maleic anhydride or 2-hydroxyethyl methacrylate.

The content of the structural units derived from an unsaturated carboxylic acid or the structural units derived from an unsaturated carboxylic acid derivative in component (G3) is preferably 0.01% by weight to 20% by weight, more preferably 0.1% by weight to 5% by weight, and even more preferably 0.3% by weight to 2% by weight. The content of all the structural units derived from monomers in component (G3) is taken as 100% by weight. The content of the structural units derived from an unsaturated carboxylic acid or the structural units derived from an unsaturated carboxylic acid derivative is measured by infrared spectroscopy.

When component (G3) contains both types of the above-described structural units, the total amount of these structural units is preferably the same content as that described above.

The melt flow rate (MFR) of the propylene-based polymer containing structural units derived from an unsaturated carboxylic acid or structural units derived from an unsaturated carboxylic acid derivative is preferably 0.1 g/10 min to 300 g/10 min, more preferably 0.5 g/10 min to 150 g/10 min. Here, the melt flow rate is measured at a test temperature of 230° C. and a test load of 21.18 N in accordance with JIS K 7210 (1995).

When component (G3) contains both types of the above-described structural units, the melt flow rate of the propylene-based polymer containing these structural units is preferably within the same range as that described above.

Examples of the α,β-unsaturated glycidyl ester include glycidyl methacrylate and glycidyl acrylate. Examples of the α,β-unsaturated glycidyl ether include allyl glycidyl ether and 2-methylallyl glycidyl ether. Glycidyl methacrylate is preferred.

The content of the structural units derived from an α,β-unsaturated glycidyl ester or the structural units derived from an α,β-unsaturated glycidyl ether in component (G3) is preferably 0.01% by weight to 20% by weight, more preferably 0.1% by weight to 5% by weight, and even more preferably 0.6% by weight to 2% by weight. The content of all the structural units derived from monomers in component (G3) is taken as 100% by weight. The content of the structural units derived from an α,β-unsaturated glycidyl ester is measured by infrared spectroscopy.

When component (G3) contains both types of the above-described structural units, the total amount of these structural units is preferably the same content as that described above.

The melt flow rate (MFR) of a propylene-based polymer comprising structural units derived from an α,β-unsaturated glycidyl ester and/or structural units derived from an α,β-unsaturated glycidyl ether is preferably 0.1 g/10 min to 300 g/10 min, more preferably 0.5 g/10 min to 100 g/10 min, and even more preferably 1 g/10 min to 50 g/10 min. Here, the melt flow rate is measured at a test temperature of 230° C. and a test load of 21.18 N in accordance with JIS K 7210 (1995).

When component (G3) contains both types of the above-described structural units, the melt flow rate of the propylene-based polymer containing these structural units is preferably within the same range as that described above.

Examples of the method for producing a propylene-based polymer comprising structural units derived from an unsaturated carboxylic acid and structural units derived from an unsaturated carboxylic acid derivative or a propylene polymer comprising one or more kinds of structural units selected from the group consisting of structural units derived from an α,β-unsaturated glycidyl ester and structural units derived from an α,β-unsaturated glycidyl ether, which are component (G3), include a method of melt-kneading the propylene-based polymer and the α,β-unsaturated glycidyl ester or the like by using a mixer, an extruder, or the like.
(Polyhydroxy Compound (H))

The polyhydroxy compound (H) is sometimes called component (H). Examples of component (H) include pentaerythritol, dipentaerythritol, tripentaerythritol, polypentaerythritol (degree of condensation≥4), trishydroxyethyl isocyanate, polyethylene glycol, glycerol, starch, grape sugar, cellulose, and sorbitol. Polyhydric alcohol compounds are preferable because they are readily compatible with a polymer, low in solubility in water, and low in hygroscopicity. At least one compound selected from the group consisting of pentaerythritol, dipentaerythritol, tripentaerythritol, and polypentaerythritol is preferable because of their low solubility in water and low hygroscopicity, and pentaerythritol is particularly preferable.

[Production Method]
(Method 1 for Producing Flame-Retardant Thermoplastic Elastomer)

A first embodiment of the present invention is a method for producing of a flame-retardant thermoplastic elastomer, wherein the method comprises:

step (1) of obtaining a thermoplastic elastomer composition by dynamically crosslinking component (A) comprising component (A1) and component (A2) in the presence of component (C) and component (D), and step (2) of kneading the thermoplastic elastomer composition, component (E), component (F), and component (G), wherein the amounts of the respective components at the time of starting the dynamic crosslinking in step (1) satisfy the following condition (p), and the amounts of the respective components at the time of starting the kneading in step (2) satisfy the following condition (q).

Condition (p): when the combined amount of component (A1), component (A2), and component (C) is taken as 100% by weight, the amount of component (A1) is 10% by weight to 75% by weight, the amount of component (A2) is 10% by weight to 50% by weight, the amount of component (C) is 1% by weight to 60% by weight, and the amount of component (D) is 0.001 parts by weight to 5 parts by weight relative to 100 parts by weight of the combined amount of component (A) and component (C)

Condition (q): the combined amount of component (E) and component (F) is 30 parts by weight to 70 parts by weight and the amount of component (G) is 0.5 parts by weight to 10 parts by weight each relative to 100 parts by weight of the thermoplastic elastomer composition.

(Step (1))

Step (1) is a step of obtaining a thermoplastic elastomer composition by dynamically crosslinking component (A) comprising component (A1) and component (A2) in the presence of component (C) and component (D).

The "dynamic crosslinking" as referred to in the present invention means a treatment to melt-knead a component to be dynamically crosslinked, under a shearing force in the presence of, at least, component (D).

The amounts of the respective components when starting dynamic crosslinking in step (1) satisfy the following condition (p).

Condition (p): when the combined amount of component (A1), component (A2), and component (C) is taken as 100% by weight, the amount of component (A1) is 10% by weight to 75% by weight, the amount of component (A2) is 10% by weight to 50% by weight, the amount of component (C) is 1% by weight to 60% by weight, and the amount of component (D) is 0.001 parts by weight to 5 parts by weight relative to 100 parts by weight of the combined amount of component (A) and component (C).

When the combined amount of component (A1), component (A2), and component (C) is taken as 100% by weight, the amount of component (A1) is preferably 20% by weight to 60% by weight, more preferably 30% by weight to 50% by weight.

When the combined amount of component (A1), component (A2), and component (C) is taken as 100% by weight, the amount of component (A2) is preferably 10% by weight to 40% by weight, more preferably 10% by weight to 30% by weight.

When the combined amount of component (A1), component (A2), and component (C) is taken as 100% by weight, the amount of component (C) is preferably 10% by weight to 55% by weight, more preferably 20% by weight to 50% by weight.

Preferably, step (1) includes a step of obtaining a thermoplastic elastomer composition precursor by kneading 10% by weight to 75% by weight of component (A1), 10% by weight to 50% by weight of component (A2), and 1% by weight to 60% by weight of component (C) where the combined amount of component (A) and component (C) is taken as 100% by weight, and a step of obtaining a thermoplastic elastomer composition by dynamically crosslinking the thermoplastic elastomer composition precursor in the presence of component (D) in an amount of 0.001 parts by weight to 5 parts by weight relative to 100 parts by weight of the thermoplastic elastomer composition precursor. In the step of kneading the thermoplastic elastomer composition precursor, component (A) in the thermoplastic elastomer composition precursor is dynamically crosslinked.

When step (1) includes the two above-mentioned steps, the amounts of component (A1), component (A2), and component (C) at the time of starting kneading in the former step are considered to be the amounts of component (A1), component (A2), and component (C) that are specified in condition (p).

The amount of component (D) is 0.001 parts by weight to 5 parts by weight, preferably is 0.05 parts by weight to 4 parts by weight, and more preferably 0.1 parts by weight to 1 part by weight, relative to 100 parts by weight of the combined amount of component (A) and component (C). If there is too much component (D), the processability of the flame-retardant thermoplastic elastomer composition obtained by the method according to the present invention may deteriorate, whereas if there is too little component (D), the mechanical strength of a molded article formed from the flame-retardant thermoplastic elastomer composition may lower.

When a crosslinking aid is used together with component (D), the amount of the crosslinking aid is preferably 0.01 parts by weight to 10 parts by weight, more preferably 0.01 parts by weight to 5 parts by weight, relative to 100 parts by weight of the combined amount of component (A) and component (C).

(Step (2))

Step (2) is a step of kneading the thermoplastic elastomer composition obtained in step (1), component (E), component (F), and component (G). The amounts of the respective components when kneading is started in step (2) satisfy the following condition (q).

Condition (q): the combined amount of component (E) and component (F) is 30 parts by weight to 70 parts by weight and the amount of component (G) is 0.5 parts by weight to 10 parts by weight each relative to 100 parts by weight of the thermoplastic elastomer composition.

The combined amount of component (E) and component (F) is preferably 30 parts by weight to 60 parts by weight, more preferably 30 parts by weight to 50 parts by weight, relative to 100 parts by weight of the thermoplastic elastomer composition. If there is too much component (E) or component (F), the processability of the flame-retardant thermoplastic elastomer composition may deteriorate, whereas if there is too little component (E) or component (F), the flame retardancy of a molded article formed from the flame-retardant thermoplastic elastomer composition obtained by the method according to the present invention may deteriorate.

The amount of component (G) is preferably 1 to 10 parts by weight, more preferably 1 to 5 parts by weight, relative to 100 parts by weight of the thermoplastic elastomer composition. If there is too much component (G), the appearance of a molded article formed from the flame-retardant thermoplastic elastomer composition is sometimes poor, whereas if there is too little component (G), a mold may be stained when the flame-retardant thermoplastic elastomer composition is injection molded.

Examples of the melt-kneading apparatus to be used for dynamic crosslinking or kneading in the respective steps include a mixing roll, which is an open type apparatus, a Banbury mixer, an extruder, a kneader, and a continuous mixer, which are non-open type apparatuses. It is preferred to use a non-open type apparatus. All components to be melt-kneaded may be melt-kneaded simultaneously or, in alternative, some components may be kneaded and then the remainder components added, followed by melt-kneading of all the components. Kneading may be carried out twice or more. The temperature in kneading is usually 150° C. to 250° C. and the kneading time is usually 1 minute to 30 minutes.

(Method 2 for Producing Flame-Retardant Thermoplastic Elastomer)

A second embodiment of the present invention is a method for producing of a flame-retardant thermoplastic elastomer, wherein the method comprises:

step (1) of obtaining a thermoplastic elastomer composition by dynamically crosslinking component (A) comprising component (A1) and component (A2) in the presence of component (C) and component (D), and step (2) of kneading the thermoplastic elastomer composition, component (E), component (F), component (G), and component (H), wherein the amounts of the respective components at the time of starting the dynamic crosslinking in step (1) satisfy the following condition (p) and the amounts of the respective components at the time of starting the kneading in step (2) satisfy the following condition (q).

Condition (p): when the combined amount of component (A1), component (A2), and component (C) is taken as 100% by weight, the amount of component (A1) is 10% by weight to 75% by weight, the amount of component (A2) is 10% by weight to 50% by weight, the amount of component (C) is 1% by weight to 60% by weight, and the amount of component (D) is 0.001 parts by weight to 5 parts by weight relative to 100 parts by weight of the combined amount of component (A) and component (C)

Condition (q): the combined amount of component (E) and component (F) is 30 parts by weight to 70 parts by weight, the amount of component (G) is 0.5 parts by weight to 10 parts by weight, and the amount of component (H) is 0.5 parts by weight to 10 parts by weight, each relative to 100 parts by weight of the thermoplastic elastomer composition.

The second embodiment differs from the first embodiment in step (2). Specifically, in step (2) of the second embodiment, component (H) is added to the components to be kneaded in the first embodiment and then these are kneaded.

The amount of component (H) is preferably 1 part by weight to 10 parts by weight, more preferably 1 to 5 parts by weight, relative to 100 parts by weight of the thermoplastic elastomer composition. If there is too much component (H), the appearance or the mechanical properties of a molded article formed from the flame-retardant thermoplastic elastomer composition obtained using the method according to the present invention may be poor.

The amounts of the respective components, the kneading conditions, etc. in the second embodiment are as described for the first embodiment. Step (1) in the second embodiment may, as in step (1) in the first embodiment, have a step of obtaining a thermoplastic elastomer composition precursor by kneading component (A) and component (C) and a step of obtaining a thermoplastic elastomer composition by dynamically crosslinking the thermoplastic elastomer composition precursor in the presence of component (D).

In the first embodiment and the second embodiment of the present invention, in addition to the above-described essential components, other components may be added as necessary unless the addition is contrary to the object of the present invention. Examples of such components include additives such as inorganic fillers (e.g., talc, calcium carbonate, and calcined kaolin), organic fillers (e.g., fiber, wood flour, and cellulose powder), antioxidants (e.g., phenol-based, sulfur-based, phosphorus-based, lactone-based, and vitamin-based antioxidants), weathering stabilizers, UV absorbers (e.g., benzotriazole-based, tridiamine-based, anilide-based, and benzophenone-based UV absorbers), heat stabilizers, light stabilizers (e.g., hindered amine light stabilizers and benzoate type light stabilizers), antistatic agents, nucleating agents, pigments, adsorbents (e.g., metal oxides), metal chlorides (e.g., ferric chloride and calcium chloride), hydrotalcite, aluminates, lubricants (e.g., fatty acids, higher alcohols, aliphatic amides, and aliphatic esters) and silicone compounds. Such an additive may be blended with component (A), component (B), component (C), component (D), component (E), component (F), component (G), and component (H) beforehand, followed by preparation of a flame-retardant thermoplastic elastomer composition using the respective components with which the additive has been blended, or alternatively, the additive may be added during or after each step. When adding an additive after step (2), kneading is further carried out after adding the additive.

The Durometer A hardness (measured in accordance with JIS K6253) of a molded article obtained from a flame-retardant thermoplastic elastomer composition obtained using the method of the present invention is preferably 30 to 95, more preferably 50 to 90, and even more preferably 60 to 80.

When the hardness is less than 30, the flame retardancy of a molded article may deteriorate whereas when the hardness is higher than 95, the softness of a molded article may deteriorate.

Various molded articles can be produced from a flame-retardant thermoplastic elastomer composition by such a method as extrusion forming, injection molding, blow molding, and calendering by using an apparatus used for an ordinary thermoplastic resin.

Molded articles formed from a flame-retardant thermoplastic elastomer composition obtained using the method of the present invention are used for various applications such as automotive interior parts such as a console box and an instrument panel surface material, and automotive exterior parts such as a window mall; various electrical machinery parts; various household electric appliance parts; various packaging members; various agricultural materials; various building members and various connector covers.

EXAMPLES

The present invention is described in more detail based on Examples, but the invention is not limited to the Examples.
(1) Mooney Viscosity ($ML_{1+4}$)

Measurement was conducted in accordance with JIS K6300. When being expressed as $ML_{1+4}$ 100° C., the test temperature is 100° C., and when being expressed as $ML_{1+4}$ 125° C., the test temperature is 125° C.
(2) Melt Flow Rate (MFR)

Measurement was conducted in accordance with JIS K7210. Measurement was carried out under conditions including a temperature of 230° C. and a load of 21.18 M for propylene-based polymers and under conditions including temperature of 190° C. and a load of 21.18 N for ethylene-based polymers.

The melt flow rates of the flame-retardant thermoplastic elastomer compositions produced in Examples 1 to 10 and Comparative Examples 1 to 4 were measured under conditions including a temperature of 230° C. and a load of 21.18 N in accordance with JIS K7210.
(3) Contents of Structural Units Derived from Ethylene, Structural Units Derived from Propylene, and Structural Units Derived from 5-ethylidene-2-norbornene Measurement was conducted by infrared spectroscopy.
(4) Hardness Durometer A hardness was measured in accordance with JIS K6253.
(5) Compression Set (Evaluation of Softness)

Measurement was conducted in accordance with JIS K6262 under conditions including 70° C., 25% compression, and 22 hours.
(6) Strength at Break and Elongation at Break Measurement was conducted using a JIS No. 3 specimen under conditions including a tensile rate of 200 mm/min in accordance with JIS K6251, and thereby a tensile strength and an elongation at break were measured.
(7) Flame Retardancy Test A specimen being 127 mm in length, 12.7 mm in width, and 1.5 mm in thickness was kept vertical, then a burner fire was brought to the bottom end of the specimen closely for 10 seconds, and then the burner was removed. The length of time taken from the removal of the burner until the fire of the specimen went out was measured. Then, as soon as the fire went out, the fire was again brought to the bottom end of the specimen closely for 10 seconds. The length of time taken from the removal of the burner until the fire of the specimen went out was measured in the same way as the first time. In addition, it was evaluated whether the cotton placed under the specimen began to burn or not due to the dropping of live charcoal on it. From the viewpoints of how long the specimen kept burning and whether the cotton began to burn or not in the first and second tests, the burning-rank was set according to the UL-94V standard. The burning rank corresponding to V-O was represented by ⊙, the rank corresponding to V-1 was represented by ○, and the rank corresponding to V-2 was represented by △. Flame retardancy decreases as the burning level get lower like V-1, V-2.
(8) Mold Stain in Injection Molding A flame-retardant thermoplastic elastomer composition was injection molded under conditions including a cylinder temperature of 220° C. and a mold temperature of 50° C. by using a side-gated flat mold and an injection molding machine EC160NII manufactured by Toshiba Machine Co., Ltd., so that an injection molded article (90 mm in length, 150 mm in width, and 2 mm in thickness) was obtained. In the tables, evaluation "○" means that there is no stain with the side-gated flat mold after successive 30 shots; evaluation "△" means that a mold stain occurs at a part of the mold after successive 30 shots; and evaluation "x" means that a mold stain occurs throughout the surface of the mold after successive 30 shots.

The materials used in the Examples are as follows.
Oil-Extended Ethylene-α-Olefin-Based Copolymer Rubber (Component (A1)+Component (C))

Oil-extended rubber prepared by adding 100 parts by weight of paraffinic mineral oil (C1) to 100 parts by weight of ethylene-propylene-5-ethylidene-2-norbornene copolymer rubber (A1) (Mooney viscosity ($ML_{1+4}$ 100° C.) of component (A)=63; in component (A1), content of structural units derived from ethylene=66% by weight, content of structural units derived from propylene=30% by weight, content of structural units derived from 5-ethylidene-2-norbornene=4% by weight; intrinsic viscosity of oil-extended rubber=4.5 dl/g)
Component (A2) Propylene-Based Polymer (A2) Propylene homopolymer (MFR (230° C., 21.18 N)=15 g/10 min)
Other Thermoplastic Resin Components High density polyethylene (commercial name "HI-ZEX 1300J" produced by Prime Polymer Co., Ltd. (density=961 kg/m$^3$, MFR=13 g/10 min))
Component (D) Crosslinking Agent (D1) Commercial name "APO-10DL" produced by Kayaku Akzo Corporation
(2,5-dimethyl-2,5-di-(tert-butylperoxy)hexane has been diluted with paraffinic oil (commercial name "PW-100" produced by Idemitsu Kosan, Co. Ltd.) in a 10% concentration)
Component (F) Zinc Oxide (F1) Commercial name "Zinc oxide Type II" produced by Seido Chemical Industry Co., Ltd.
Halogen-free flame retardant+zinc oxide (component (E)+component (F))
(E1/F1) Commercial name "ADK STAB FP-2200" (a mixture of a phosphate and zinc oxide) produced by ADEKA CORPORATION
(E2/F1) Commercial name "ADK STAB FP-2200S" (a mixture of a phosphate and zinc oxide) produced by ADEKA CORPORATION
Component (G) Thermoplastic Resin with a Polar Group
(G1-1) Commercial name "ACRYFT K307" (ethylene-methyl methacrylate copolymer, MFR (190° C.)=7 g/10 min, content of structural units derived from methyl methacrylate=25% by weight) produced by Sumitomo Chemical Co., Ltd.
(G1-2) Commercial name "ACRYFT WK402" (ethylene-methyl methacrylate copolymer, MFR (190° C.)=20 g/10 min, content of structural units derived from methyl methacrylate=25% by weight) produced by Sumitomo Chemical Co., Ltd.
(G1-3) Commercial name "ACRYFT WH401" (ethylene-methyl methacrylate copolymer, MFR (190° C.)=20 g/10 min, content of structural units derived from methyl methacrylate=20% by weight) produced by Sumitomo Chemical Co., Ltd.
(G2-1) Commercial name "Hitanol 1501" (novolac type phenol resin, softening point: 85 to 100° C.) produced by Hitachi Chemical Co., Ltd.
Component (H) Polyhydroxy Compound
(H1) Commercial name "Pentarit" (pentaerythritol) produced by Koei Chemical Co., Ltd.

Example 1

Production of Flame-Retardant Thermoplastic Elastomer Composition

A thermoplastic elastomer composition precursor was obtained by kneading, at 200±10° C. using a twin screw extruder, 87.4% by weight of an oil-extended ethylene-α-olefin-based copolymer rubber ((A1)+(C)), 12.6% by weight of a propylene-based polymer (A2), and high density polyethylene (commercial name "HI-ZEX 1300J" produced by Prime Polymer Co., Ltd. (density=961 kg/m$^3$, MFR=13 g/10 min) in an amount of 2.9 parts by weight per 100 parts by weight of the oil-extended ethylene-α-olefin-based copolymer rubber and the propylene-based polymer in total.

Next, a thermoplastic elastomer was obtained by kneading (in other words, dynamically crosslinking), at 200±10° C. using a twin screw extruder, 100 parts by weight of the resulting thermoplastic elastomer composition precursor, 3.2 parts by weight of a crosslinking agent (D1), 0.3 parts by weight of a crosslinking aid (trimethylolpropane trimethacrylate (commercial name "Hi-Cross M-P" produced by Seiko Chemical Co., Ltd.), 0.1 parts by weight of an antioxidant (commercial name "SUMILIZER GA80" produced by Sumitomo Chemical Co., Ltd.), 0.2 parts by weight of a diazo type weathering stabilizer (commercial name "SUMISORB 300" by Sumitomo Chemical Co., Ltd.), and 0.2 parts by weight of a hindered amine type weathering stabilizer (a HALS type weathering stabilizer, commercial name "TINUVIN 622" produced by Ciba Specialty Chemicals).

Next, a flame-retardant elastomer composition was produced by kneading, at 200±10° C. using a twin screw extruder, 100 parts by weight of the resulting thermoplastic elastomer composition, 47.1 parts by weight of a halogen-free flame retardant (E2/F1), 2.9 parts by weight of a thermoplastic resins with a polar group (G1-1), and 1.5 parts by weight of a polyhydroxy compound (H1). The results of physical properties measurement are shown in Table 1.

Example 2

Production of Flame-Retardant Thermoplastic Elastomer Composition

Operations were carried out in the same manner as in Example 1 except that the loading of the halogen-free flame retardant (E2/F1) was changed to 42.6 parts by weight and that 0.7 parts by weight of zinc oxide (F1) was further added. The results of physical properties measurement are shown in Table 1.

Example 3

Production of Flame-Retardant Thermoplastic Elastomer Composition

Operations were carried out in the same manner as in Example 1 except that 2.9 parts by weight of a thermoplastic resin with a polar group (G1-2) was added instead of the thermoplastic resin with a polar group (G1-1). The results of physical properties measurement are shown in Table 1.

Example 4

Production of Flame-Retardant Thermoplastic Elastomer Composition

Operations were carried out in the same manner as in Example 1 except that 2.9 parts by weight of a thermoplastic resin with a polar group (G1-3) was added instead of the thermoplastic resin with a polar group (G1-1). The results of physical properties measurement are shown in Table 1.

Example 5

Production of Flame-Retardant Thermoplastic Elastomer Composition

Operations were carried out in the same manner as in Example 1 except that 53.8 parts by weight of the halogen-free flame retardant (E1/F1) was added to 100 parts by weight of the thermoplastic elastomer composition and that 3.1 parts by weight of a thermoplastic resin with a polar group (G2-1) was added instead of the thermoplastic resin with a polar group (G1-1). The results of physical properties measurement are shown in Table 1.

Example 6

Production of Flame-Retardant Thermoplastic Elastomer Composition

Operations were carried out in the same manner as in Example 5 except that the loading of the thermoplastic resin with a polar group (G2-1) was changed to 7.7 parts by weight. The results of physical properties measurement are shown in Table 1.

Example 7

Production of Flame-Retardant Thermoplastic Elastomer Composition

Operations were carried out in the same manner as in Example 5 except that 42.9 parts by weight of a halogen-free flame retardant (E2/F1) was added instead of the halogen-free flame retardant (E1/F1) and that the loading of the thermoplastic resin with a polar group (G2-1) was changed to 2.9 parts by weight. The results of physical properties measurement are shown in Table 1.

Example 8

Production of Flame-Retardant Thermoplastic Elastomer Composition

Operations were carried out in the same manner as in Example 1 except that 2.9 parts by weight of a thermoplastic resin with a polar group (G2-1) was added instead of the thermoplastic resin with a polar group (G1-1). The results of physical properties measurement are shown in Table 1.

Example 9

Production of Flame-Retardant Thermoplastic Elastomer Composition

Operations were carried out in the same manner as in Example 2 except that 2.9 parts by weight of a thermoplastic resin with a polar group (G2-1) was added instead of the thermoplastic resin with a polar group (G1-1). The results of physical properties measurement are shown in Table 1.

Example 10

Production of Flame-Retardant Thermoplastic Elastomer Composition 84.2% by weight of an oil-extended ethylene-α-olefin-based copolymer rubber ((A1)+(C1)) and 15.8% by weight of the propylene-based polymer (A2) were kneaded with a twin screw extruder at 200±10° C., affording a thermoplastic elastomer composition precursor.

Next, a thermoplastic elastomer composition was obtained by kneading (in other words, dynamically crosslinking) at 200±10° C. using a twin screw extruder, 100 parts by weight of the resulting thermoplastic elastomer composition precursor, 3.2 parts by weight of a crosslinking agent (D1), 0.3 parts by weight of a crosslinking aid (trimethylolpropane trimethacrylate (commercial name "Hi-Cross M-P" produced by Seiko Chemical Co., Ltd.)), 0.1 parts by weight of an antioxidant (commercial name "SUMILIZER GA80" produced by Sumitomo Chemical Co., Ltd.), 0.2 parts by weight of a diazo type weathering stabilizer (commercial name "SUMISORB 300" by Sumitomo Chemical Co., Ltd.), and 0.2 parts by weight of a HALS type weathering stabilizer (commercial name "TINUVIN 622" produced by Ciba Specialty Chemicals).

Next, a flame-retardant thermoplastic elastomer composition was produced by kneading, at 200±10° C. using a twin screw extruder, 100 parts by weight of the resulting thermoplastic elastomer composition, 42.6 parts by weight of a halogen-free flame retardant (E2/F1), 2.9 parts by weight of a thermoplastic resin with a polar group (G1-1), and 1.5 parts by weight of a polyhydroxy compound (H1). The results of physical properties measurement are shown in Table 1.

Comparative Example 1

Production of Flame-Retardant Thermoplastic Elastomer Composition

Operations were carried out in the same manner as in Example 1 except that 65.3 parts by weight of the halogen-free flame retardant (E1/F1) was added to 100 parts by weight of the thermoplastic elastomer composition and no thermoplastic resin with a polar group (G1-1) and no polyhydroxy compound (H1) were added. The results of physical properties measurement are shown in Table 2.

Comparative Example 2

Production of Flame-Retardant Thermoplastic Elastomer Composition

Operations were carried out in the same manner as in Comparative Example 1 except that 52.8 parts by weight of the halogen-free flame retardant (E2/F1) was added instead of the halogen-free flame retardant (E1/F1). The results of physical properties measurement are shown in Table 2.

Comparative Example 3

Production of Flame-Retardant Thermoplastic Elastomer Composition

Operations were carried out in the same manner as in Comparative Example 1 except that the loading of the halogen-free flame retardant (E1/F1) was changed to 42.0 parts by weight and 2.5 parts by weight of the polyhydroxy compound (H1) was further added. The results of physical properties measurement are shown in Table 2.

Comparative Example 4

Production of Flame-Retardant Thermoplastic Elastomer Composition

Operations were carried out in the same manner as in Comparative Example 2 except that the loading of the halogen-free flame retardant (E2/F1) was changed to 32.7 parts by weight and 1.3 parts by weight of the polyhydroxy compound (H1) was further added. The results of physical properties measurement are shown in Table 2.

TABLE 1

| | | | | | Example 1 | Example 2 | Example 3 | Example 4 | Example 5 |
|---|---|---|---|---|---|---|---|---|---|
| Formulation | Step (1) | (A) | (A1) | (% by weight) | 43.7 | 43.7 | 43.7 | 43.7 | 43.7 |
| | | | (A2) | (% by weight) | 12.6 | 12.6 | 12.6 | 12.6 | 12.6 |
| | | | HI-ZEX 1300J | (part by weight) | 2.9 | 2.9 | 2.9 | 2.9 | 2.9 |
| | | (C1) | | (% by weight) | 43.7 | 43.7 | 43.7 | 43.7 | 43.7 |
| | | (A) + (C1) | | (% by weight) | 102.9 | 102.9 | 102.9 | 102.9 | 102.9 |
| | | (A) + (C1) | | (part by weight) | 100.0 | 100.0 | 100.0 | 100.0 | 100.0 |
| | | (D1) | | (part by weight) | 3.2 | 3.2 | 3.2 | 3.2 | 3.2 |
| | | Crosslinking aid | | (part by weight) | 0.3 | 0.3 | 0.3 | 0.3 | 0.3 |
| | | Antioxidant | | (part by weight) | 0.1 | 0.1 | 0.1 | 0.1 | 0.1 |
| | | Diazo type weathering stabilizer | | (part by weight) | 0.2 | 0.2 | 0.2 | 0.2 | 0.2 |
| | | HALS type weathering stabilizer | | (part by weight) | 0.2 | 0.2 | 0.2 | 0.2 | 0.2 |
| | | Thermoplastic elastomer composition | | (part by weight) | 104.0 | 104.0 | 104.0 | 104.0 | 104.0 |

TABLE 1-continued

| | | | | Example 1 | Example 2 | Example 3 | Example 4 | Example 5 |
|---|---|---|---|---|---|---|---|---|
| | Step (2) | Thermoplastic elastomer composition | (part by weight) | 100.0 | 100.0 | 100.0 | 100.0 | 100.0 |
| | | (E1 + F1) | (part by weight) | | | | | 53.8 |
| | | (E2 + F1) | (part by weight) | 47.1 | 42.6 | 47.1 | 47.1 | |
| | | (F1) | (part by weight) | | 0.7 | | | |
| | | (G1 − 1) | (part by weight) | 2.9 | 2.9 | | | |
| | | (G1 − 2) | (part by weight) | | | 2.9 | | |
| | | (G1 − 3) | (part by weight) | | | | 2.9 | |
| | | (G2 − 1) | (part by weight) | | | | | 3.1 |
| | | (H1) | (part by weight) | 1.5 | 1.5 | 1.5 | 1.5 | |
| Physical property evaluation | Combustion test | | — | ⊙ | ⊙ | ○ | ⊙ | ⊙ |
| | MFR | | g/10 min | 13 | 16 | 13 | 12 | 10 |
| | Hardness | | — | 76 | 75 | 75 | 77 | 80 |
| | Strength at break | | MPa | 2.7 | 3.5 | 2.5 | 2.7 | 3.5 |
| | Elongation at break | | % | 400 | 460 | 378 | 420 | 570 |
| | Compression set | | % | 45 | 40 | 46 | 44 | 44 |
| | Mold stainability | | — | ○ | ○ | ○ | ○ | △ |

| | | | | | Example 6 | Example 7 | Example 8 | Example 9 | Example 10 |
|---|---|---|---|---|---|---|---|---|---|
| Formulation | Step (1) | (A) | (A1) | (% by weight) | 43.7 | 43.7 | 43.7 | 43.7 | 42.1 |
| | | | (A2) | (% by weight) | 12.6 | 12.6 | 12.6 | 12.6 | 15.8 |
| | | | HI-ZEX 1300J | (part by weight) | 2.9 | 2.9 | 2.9 | 2.9 | |
| | | (C1) | | (% by weight) | 43.7 | 43.7 | 43.7 | 43.7 | 42.1 |
| | | (A) + (C1) | | (% by weight) | 102.9 | 102.9 | 102.9 | 102.9 | 100.0 |
| | | (A) + (C1) | | (part by weight) | 100.0 | 100.0 | 100.0 | 100.0 | 100.0 |
| | | (D1) | | (part by weight) | 3.2 | 3.2 | 3.2 | 3.2 | 3.2 |
| | | Crosslinking aid | | (part by weight) | 0.3 | 0.3 | 0.3 | 0.3 | 0.3 |
| | | Antioxidant | | (part by weight) | 0.1 | 0.1 | 0.1 | 0.1 | 0.1 |
| | | Diazo type weathering stabilizer | | (part by weight) | 0.2 | 0.2 | 0.2 | 0.2 | 0.2 |
| | | HALS type weathering stabilizer | | (part by weight) | 0.2 | 0.2 | 0.2 | 0.2 | 0.2 |
| | | Thermoplastic elastomer composition | | (part by weight) | 104.0 | 104.0 | 104.0 | 104.0 | 104.0 |
| | Step (2) | Thermoplastic elastomer composition | | (part by weight) | 100.0 | 100.0 | 100.0 | 100.0 | 100.0 |
| | | (E1 + F1) | | (part by weight) | 53.8 | | | | |
| | | (E2 + F1) | | (part by weight) | | 42.9 | 47.1 | 42.6 | 42.6 |
| | | (F1) | | (part by weight) | | | | 0.7 | |
| | | (G1 − 1) | | (part by weight) | | | | | 2.9 |
| | | (G1 − 2) | | (part by weight) | | | | | |
| | | (G1 − 3) | | (part by weight) | | | | | |
| | | (G2 − 1) | | (part by weight) | 7.7 | 2.9 | 2.9 | 2.9 | |
| | | (H1) | | (part by weight) | | | 1.5 | 1.5 | 1.5 |
| Physical property evaluation | Combustion test | | | — | ⊙ | ⊙ | ⊙ | ⊙ | ⊙ |
| | MFR | | | g/10 min | 19 | 12 | 14 | 17 | 23 |
| | Hardness | | | — | 81 | 80 | 78 | 75 | 74 |
| | Strength at break | | | MPa | 3.7 | 4.3 | 2.6 | 3.5 | 4.6 |
| | Elongation at break | | | % | 650 | 636 | 442 | 460 | 390 |
| | Compression set | | | % | 44 | 38 | 42 | 40 | 45 |
| | Mold stainability | | | — | ○ | ○ | ○ | ○ | ○ |

TABLE 2

| | | | | | Comparative Example 1 | Comparative Example 2 | Comparative Example 3 | Comparative Example 4 |
|---|---|---|---|---|---|---|---|---|
| Formulation | Step (1) | (A) | (A1) | (% by weight) | 43.7 | 43.7 | 43.7 | 43.7 |
| | | | (A2) | (% by weight) | 12.6 | 12.6 | 12.6 | 12.6 |
| | | | HI-ZEX 1300J | (part by weight) | 2.9 | 2.9 | 2.9 | 2.9 |
| | | (C1) | | (% by weight) | 43.7 | 43.7 | 43.7 | 43.7 |
| | | (A) + (C1) | | (% by weight) | 102.9 | 102.9 | 102.9 | 102.9 |
| | | (A) + (C1) | | (part by weight) | 100.0 | 100.0 | 100.0 | 100.0 |
| | | (D1) | | (part by weight) | 3.2 | 3.2 | 3.2 | 3.2 |
| | | Crosslinking aid | | (part by weight) | 0.3 | 0.3 | 0.3 | 0.3 |
| | | Antioxidant | | (part by weight) | 0.1 | 0.1 | 0.1 | 0.1 |
| | | Diazo type weathering stabilizer | | (part by weight) | 0.2 | 0.2 | 0.2 | 0.2 |
| | | HALS type weathering stabilizer | | (part by weight) | 0.2 | 0.2 | 0.2 | 0.2 |

TABLE 2-continued

|  |  |  |  | Comparative Example 1 | Comparative Example 2 | Comparative Example 3 | Comparative Example 4 |
|---|---|---|---|---|---|---|---|
|  |  | Thermoplastic elastomer composition | (part by weight) | 104.0 | 104.0 | 104.0 | 104.0 |
|  | Step (2) | Thermoplastic elastomer composition | (part by weight) | 100.0 | 100.0 | 100.0 | 100.0 |
|  |  | (E1 + F1) | (part by weight) | 65.3 |  | 42.0 |  |
|  |  | (E2 + F1) | (part by weight) |  | 52.8 |  | 32.7 |
|  |  | (H1) | (part by weight) |  |  | 2.5 | 1.3 |
| Physical property evaluation | Combustion test |  | — | ⊙ | ⊙ | ⊙ | ⊙ |
|  | MFR |  | g/10 min | 7 | 10 | 60 | 19 |
|  | Hardness |  | — | 77 | 79 | 78 | 76 |
|  | Strength at break |  | MPa | 3.1 | 3.0 | 3.2 | 5.1 |
|  | Elongation at break |  | % | 360 | 500 | 480 | 670 |
|  | Compression set |  | % | 42 | 48 | 43 | 48 |
|  | Mold stainability |  | — | X | X | X | X |

\* In Tables 1 and 2, the values of "(A)+(C1) (% by weight)" are each a value obtained by adding the loading of Hi-ZEX 1300J to the sum total 100% by weight of the loadings of (A1), (A2), and (C1) for Examples 1 to 9 and Comparative Examples 1 to 4. The value of "(A)+(C1) (part by weight)" is a value obtained when the value of "(A)+(C1) (% by weight)" is taken as 100 parts by weight.

What is claimed is:

1. A method for producing a flame-retardant thermoplastic elastomer composition, wherein the method comprises:
    step (1) of obtaining a thermoplastic elastomer composition by dynamically crosslinking a polymer mixture (A) comprising an ethylene-α-olefin-based copolymer rubber (A1) and a propylene-based polymer (A2) in the presence of a mineral oil-based softening agent (C) and a crosslinking agent (D), and
    step (2) of kneading the thermoplastic elastomer composition, a halogen-free flame retardant (E), zinc oxide (F), and a thermoplastic resin with a polar group (G), wherein
    the amounts of the respective components at the time of starting the dynamic crosslinking in step (1) satisfy the following condition (p), and
    the amounts of the respective components at the time of starting the kneading in step (2) satisfy the following condition (q), and wherein
    condition (p) requires that when the combined amount of the ethylene-α-olefin-based copolymer rubber (A1), the propylene-based polymer (A2) and the mineral oil-based softening agent (C) is taken as 100% by weight, the amount of the ethylene-α-olefin-based copolymer rubber (A1) is 10 to 75% by weight, the amount of the propylene-based polymer (A2) is 10 to 50% by weight, and the amount of the mineral oil-based softening agent (C) is 1 to 60% by weight, and the amount of the crosslinking agent (D) is 0.001 to 5 parts by weight relative to 100 parts by weight of the combined amount of the polymer mixture (A) and the mineral oil-based softening agent (C), and
    condition (q) requires that the combined amount of the halogen-free flame retardant (E) and the zinc oxide (F) is 30 to 70 parts by weight and the amount of the thermoplastic resin with a polar group (G) is 0.5 to 10 parts by weight, each relative to 100 parts by weight of the thermoplastic elastomer composition.

2. A method for producing a flame-retardant thermoplastic elastomer composition, wherein the method comprises:
    step (1) of obtaining a thermoplastic elastomer composition by dynamically crosslinking a polymer mixture (A) comprising an ethylene-α-olefin-based copolymer rubber (A1) and a propylene-based polymer (A2) in the presence of a mineral oil-based softening agent (C) and a crosslinking agent (D), and
    step (2) of kneading the thermoplastic elastomer composition, a halogen-free flame retardant (E), zinc oxide (F), a thermoplastic resin with a polar group (G), and a polyhydroxy compound (H), wherein
    the amounts of the respective components at the time of starting the dynamic crosslinking in step (1) satisfy the following condition (p), and
    the amounts of the respective components at the time of starting the kneading in step (2) satisfy the following condition (q), and wherein
    condition (p) requires that when the combined amount of the ethylene-α-olefin-based copolymer rubber (A1), the propylene-based polymer (A2) and the mineral oil-based softening agent (C) is taken as 100% by weight, the amount of the ethylene-α-olefin-based copolymer rubber (A1) is 10 to 75% by weight, the amount of the propylene-based polymer (A2) is 10 to 50% by weight, and the amount of the mineral oil-based softening agent (C) is 1 to 60% by weight, and the amount of the crosslinking agent (D) is 0.001 to 5 parts by weight relative to 100 parts by weight of the combined amount of the polymer mixture (A) and the mineral oil-based softening agent (C), and
    condition (q) requires that the combined amount of the halogen-free flame retardant (E) and the zinc oxide (F) is 30 to 70 parts by weight, the amount of the thermoplastic resin with a polar group (G) is 0.5 to 10 parts by weight, and the amount of the polyhydroxy compound (H) is 0.5 to 10 parts by weight each relative to 100 parts by weight of the thermoplastic elastomer composition.

3. The method according to claim 1, wherein step (1) comprises:
    a step of obtaining a thermoplastic elastomer composition precursor by kneading 10 to 75% by weight of the ethylene-α-olefin-based copolymer rubber (A1), 10 to 50% by weight of the propylene-based polymer (A2), and the 1 to 60% by weight of the mineral oil-based softening agent (C), where the combined amount of the polymer mixture (A) and the mineral oil-based softening agent (C) is taken as 100% by weight, and
    a step of obtaining the thermoplastic elastomer composition by adding 0.001 to 5 parts by weight of a crosslinking agent (D) to 100 parts by weight of the thermoplastic elastomer composition precursor and dynamically crosslinking the thermoplastic elastomer composition precursor.

4. The method according to claim 1, wherein the halogen-free flame retardant (E) is a phosphate compound.

5. The method according to claim 2, wherein the polyhydroxy compound (H) is at least one compound selected from the group consisting of pentaerythritol, dipentaerythritol, tripentaerythritol, and polypentaerythritol.

6. The method according to claim 1, wherein the Durometer A hardness of the flame-retardant thermoplastic elastomer composition is 30 to 95.

* * * * *